United States Patent [19]

Lee et al.

[11] Patent Number: 5,426,556
[45] Date of Patent: Jun. 20, 1995

[54] EXTRA PROTECTION MODULE OF AN EXCHANGE

[75] Inventors: Yoon J. Lee; Young H. Im, both of Daejeon; Hong S. Nam, Chung Book; Sueng H. Lee, Daejeon, all of Rep. of Korea

[73] Assignees: Electronics and Telecommunications Research Institute, Daejeon; Korea Telecommunication Authority, Seoul, both of Rep. of Korea

[21] Appl. No.: 229,148

[22] Filed: Apr. 18, 1994

Related U.S. Application Data

[63] Continuation of Ser. No. 811,080, Dec. 20, 1991, abandoned.

[30] Foreign Application Priority Data

Dec. 31, 1990 [KR] Rep. of Korea ............... 1990-22825

[51] Int. Cl.⁶ ............................................... H02H 9/00
[52] U.S. Cl. ............................ 361/119; 361/56; 361/91; 361/118
[58] Field of Search ................ 361/119, 120, 56, 91, 361/111, 118

[56] References Cited

U.S. PATENT DOCUMENTS 4,907,120  3/1990  Kaczmarek ...................... 361/119
4,964,160 10/1990  Traube et al. ...................... 361/119

Primary Examiner—Marc S. Hoff
Assistant Examiner—S. Jackson
Attorney, Agent, or Firm—Blakely, Sokoloff, Taylor & Zafman

[57] ABSTRACT

A protection module connected between a main distributing frame and an exchange, for protecting a subscriber circuit from an overvoltage or an overcurrent, comprises an overcurrent protecting device 21 connected between an output of the main distributing frame and a tip line of the exchange; an overcurrent protecting device 211 connected between an output of the main distributing frame and a ring line of the exchange; and an overvoltage protecting device 22 connected in parallel between the tip line and the ring line, having an output (GND) line connected to the exchange.

5 Claims, 2 Drawing Sheets

EXTRA PROTECTION MODULE OF AN EXCHANGE

This is a continuation of application Ser. No. 07/811,080, filed Dec. 20, 1991 now abandoned.

BACKGROUND OF THE INVENTION

The present invention relates to a protection module for protecting a subscriber circuit of an exchange from an overvoltage or an overcurrent.

The recent electric exchange requires the function of BORSCHT(Battery feed, Overvoltage protection, Ringing, Supervision, Coding, Hybrid, Test access) for analog subscriber interface and have implemented the analog subscriber interface circuit as the semiconductor integrated circuit (SLIC IC). The conventional overvoltage, overcurrent protecting devices could not protect completely the electric exchange because this SLIC IC has inferior durability for the overvoltage and overcurrent than that of the transformer of the mechanical exchange.

SUMMARY OF THE INVENTION

It is an object of the invention to provide a protection module of an exchange which can protect completely the exchange from overvoltage or overcurrent.

To achieve said object, the invention provides a protection module for protecting a subscriber circuit from an overvoltage or an overcurrent, comprising : first overcurrent protecting means connected between an output of the main distributing frame and a tip line of the exchange ; second overcurrent protecting means connected between an output of the main distributing frame and a ring line of the exchange ; overvoltage protecting means connected in parallel between the tip line and the ring line, having an output (GND) line connected to the exchange ; and whereby the protection module is located at between the main distributing frame and the exchange.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
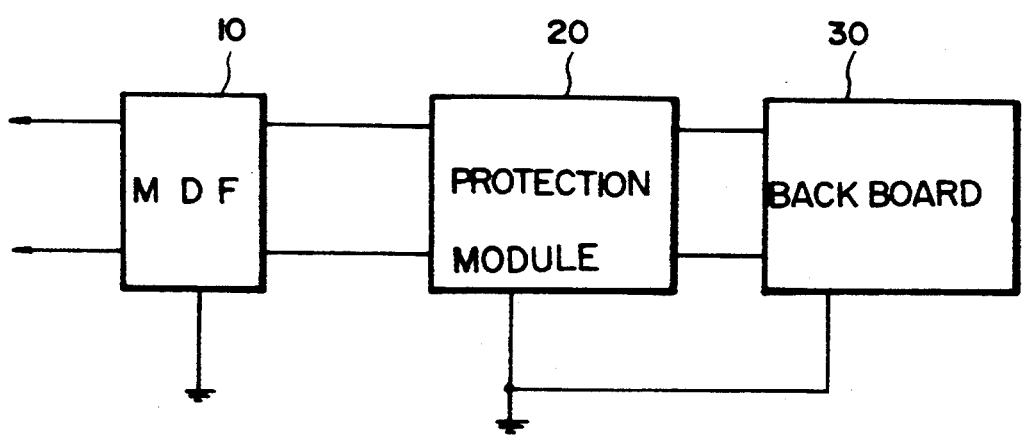
FIG. 1 is a block diagram of showing briefly this invention.

FIG. 1 is block diagram of showing briefly this invention, and in FIG. 1, the reference number 10 shows a Main Distributing Frame (MDF), 20 a protection module, and 30 an exchange backboard, respectively.

The MDF 10 is the frame where crossconnections are made between the outside plant and central office equipment. Generally, the MDF 10 includes the protection plug comprising the gas tube and the heat coil, and this plug controls that somewhat high voltage flows into the exchange 30.

If the overvoltage more than the high voltage flows into the exchange without being controlled at the protection plug, the exchange is implemented so the overvoltage is discharged into the earth at the backboard 30 thereof without affecting the subscriber circuit.

The protection module 20 is implemented in order to minimize the energy quantity flowed into the exchange from the overvoltage/overcurrent, and in order to supplement and complete the function of the MDF.

In implementing the protection module 20, the normal and abnormal conditions of the analog subscriber lines should be defined. The normal condition is that the leak current ($\mu$A) flows into the internal circuit due to the insulating resistor of the overvoltage protection device connected between the line and the earth, and that the positive voltage is applied into the tip line and the negative voltage is applied into the ring line when the subscriber is in the hook-off state. At this time, in case that the subscriber line throws in contact with the earth, it controls the loop current of the subscriber line, and in case that misoperation is stopped, the subscriber line is in the normal state. And also the current provided with the subscriber is about 130 mA, and the device should be not operated about 130 mA and not cause a fire or a harmful gas. The abnormal condition can be generated by the direct or indirect thunderbolt or AC power. At this time, the overvoltage/overcurrent flows. The exchange should control rapidly the overvoltage/overcurrent.

Figure 2:
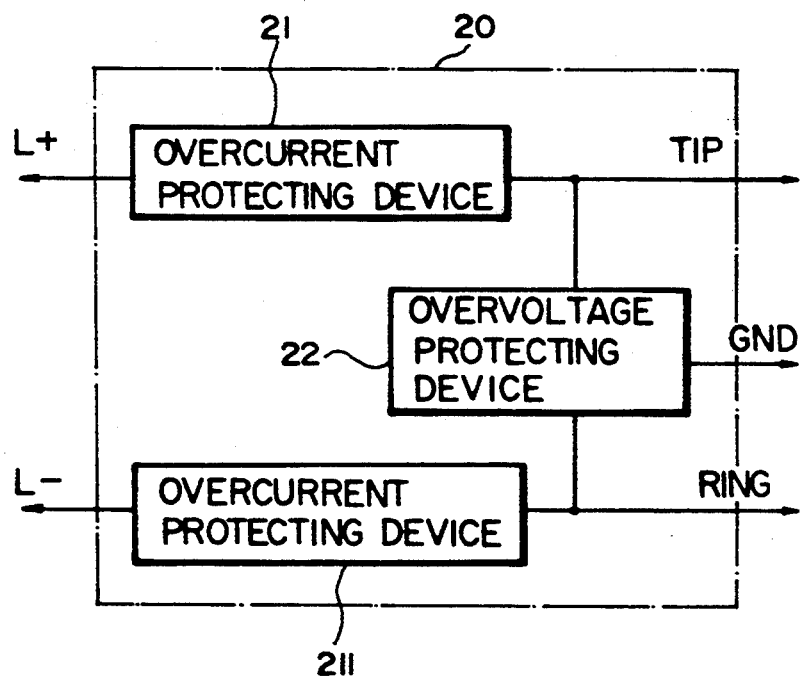
FIG. 2 is a construction diagram of the protection module.

FIG. 2 is the construction diagram of the protection module, and in FIG. 2, 21 and 211 shows overcurrent protecting devices, and 22 shows overvoltage protecting device.

The overcurrent protecting devices 21 and 211 are respectively connected to the two lines (L+, L−) of the MDF 10. The overcurrent protecting device can be constructed by the PTC(Positive Temperature Coefficient) resistor using the polymer in order to eliminate the negative resistor characteristics. That is, in AC normal power condition, if the temperature of the PTC resistor goes up until the critical temperature, the operating resistor value of the PTC is increased rapidly (0.1–1.0M$\Omega$), the current is reduced, and the consuming power is increased.

Therefore, if the continuously applied voltage is very high, it is over the critical temperature and it causes instability of the subscriber circuit and fault of the resistor. And so in this invention the overcurrent protecting device is constructed by the PTC resistor using the polymer to eliminate such negative resistor characteristics.

The overcurrent protecting devices 21 and 211 are connected as one pair because of the impedance unbalance characteristics for the ground of the line, and the resistance value difference between the tip line and the ring line is within ±1%.

The overvoltage protecting device 22 is connected in parallel with the two lines (tip and ring) and the output (GND) thereof is connected to the exchange backboard 30.

The overvoltage protecting device 22 can be constructed by a thyristor or a gas tube device, and it is shorted soon in case that the overvoltage flows into. And also it has a rapid response characteristics and can absorb much energy within short time.

Figure 3:
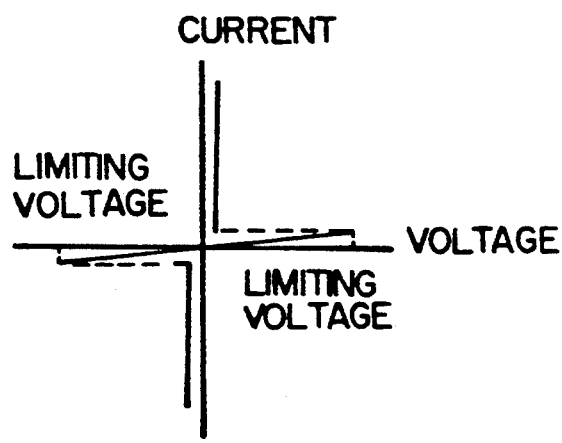
FIG. 3 is a graph diagram of showing the characteristics of the overvoltage protecting device.

FIG. 3 is a diagram of showing the characteristics of the overvoltage protecting device. As shown in the drawing, if the voltage more than the limiting voltage flows into, it is shorted, and if such voltage is eliminated, it is restored again to the original state.

As shown above, the invention has the effects that it minimizes the energy quantity of the overvoltage and overcurrent flowing into the exchange, the exchange easily detects the contents in failure of the overvoltage and overcurrent protecting devices, and the maintenance is simple and its cost is reduced because of replacing just the protecting module instead of the backboard.

What is claimed is:

1. A protection module of an exchange connected between a telephone line pair via a main distributing frame and input terminals of a subscriber line interface board equipped at a backboard of the exchange, for protecting the subscriber line interface board from an overvoltage and an overcurrent, the protection module comprising:

first and second means for protecting against overcurrent, respectively connected in series between the line pair via the main distributing frame and the input terminals of the subscriber line interface board of the exchange, tip and ring lines; and means for protecting against over voltage, connected in parallel between output terminals of said first and second means for protecting against overcurrent and the input terminals of the subscriber line interface board of the exchange, tip and ring lines, having an output line connected to ground of the subscriber line interface board of the exchange.

2. The extra protection module according to claim 1, wherein the overvoltage protection means includes a thyristor.

3. The extra protection module according to claim 2, wherein the overvoltage protecting means includes a glass tube.

4. The extra protection module according to claim 1, wherein the first means for protecting against overcurrent includes a positive temperature coefficient resistor.

5. The extra protection module according to claim 4, wherein the positive temperature coefficient resistor is made of a polymer.

* * * * *